US011549284B2

(12) United States Patent
Chou et al.

(10) Patent No.: US 11,549,284 B2
(45) Date of Patent: Jan. 10, 2023

(54) LOCKING STRUCTURE

(71) Applicant: GETAC TECHNOLOGY CORPORATION, Hsinchu County (TW)

(72) Inventors: Hsin-Chih Chou, Taipei (TW); Juei-Chi Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 1017 days.

(21) Appl. No.: 16/262,815

(22) Filed: Jan. 30, 2019

(65) Prior Publication Data
US 2019/0352936 A1 Nov. 21, 2019

Related U.S. Application Data

(60) Provisional application No. 62/672,520, filed on May 16, 2018.

(51) Int. Cl.
*E05B 65/00* (2006.01)
*E05C 5/00* (2006.01)
*E05C 19/10* (2006.01)
*G06F 1/16* (2006.01)

(52) U.S. Cl.
CPC .......... *E05B 65/0067* (2013.01); *E05C 5/00* (2013.01); *E05C 19/10* (2013.01); *E05Y 2900/606* (2013.01); *G06F 1/1616* (2013.01)

(58) Field of Classification Search
CPC ........ E05B 65/0067; E05C 5/00; E05C 19/10; G06F 1/1616; E05Y 2900/606
See application file for complete search history.

(56) References Cited

U.S. PATENT DOCUMENTS

| 6,203,075 B1* | 3/2001 | Wells, Jr. | B65D 45/24 292/113 |
| 7,370,891 B1* | 5/2008 | Schmitt | E05B 17/2053 292/113 |
| 8,297,464 B2* | 10/2012 | Grenier | E05B 65/52 220/314 |
| 8,328,247 B2* | 12/2012 | Tonelli | A45C 13/1084 292/110 |
| 9,259,593 B2* | 2/2016 | Roach | A61N 1/3968 |
| 9,422,749 B2* | 8/2016 | Lu | E05B 65/006 |
| 9,795,052 B2* | 10/2017 | Hsiao | H05K 7/18 |
| 10,858,160 B2* | 12/2020 | Yang | B65D 45/24 |
| 10,871,014 B2* | 12/2020 | Cho | E05C 19/12 |

(Continued)

Primary Examiner — Mark A Williams

(57) ABSTRACT

A locking structure, for fastening together a first case and a second case, includes: a fastening portion disposed on the first case, a hook portion movable between a locking position and a release position, and a tension spring with one end disposed at the second case and the other end disposed at the hook portion. When the hook portion moves to the locking position under an applied force, the hook portion becomes fastened to the fastening portion. After the hook portion has separated from the fastening portion under an applied force, the tension spring exerts a restoring force under which the hook portion returns to the release position. After the hook portion has separated from the fastening portion under the applied force, the tension spring pulls the hook portion back to the release position without a user's manipulation.

7 Claims, 5 Drawing Sheets

(56) References Cited

U.S. PATENT DOCUMENTS

| 11,027,894 | B2* | 6/2021 | Tomasiak | A47L 7/0019 |
| 2008/0309096 | A1* | 12/2008 | Andren | E05C 19/14 |
| | | | | 292/66 |
| 2012/0317933 | A1* | 12/2012 | Crull | E05B 65/5276 |
| | | | | 220/324 |
| 2020/0291696 | A1* | 9/2020 | Seki | B60R 7/04 |

* cited by examiner

LOCKING STRUCTURE

CROSS-REFERENCE TO RELATED APPLICATIONS

The present application claims the benefit of U.S. provisional Patent Application No. 62/672,520, filed on May 16, 2018, the disclosure of which is hereby incorporated by reference herein in its entirety.

BACKGROUND OF THE INVENTION

Field of the Invention

The present disclosure relates to locking structures and, more particularly, to a locking structure which is structurally simple and capable of being locked and released quickly.

Description of the Prior Art

A conventional electronic device with an open/close lid is equipped with a locking structure whereby, in the course of transport of the conventional electronic device, upper and lower cases of the conventional electronic device are fastened together to prevent the lid from opening. The conventional locking structure has a simple fastening structure which must be operated by a user by hand in order for the conventional locking structure to be locked (moved to a locking position) or released (restored to an initial position). Alternatively, the conventional locking structure has an intricate fastening structure whereby the conventional locking structure is moved to a locking position and then subjected to a force under which the conventional locking structure is restored to an initial position.

SUMMARY OF THE INVENTION

The aforesaid intricate fastening structure is the usual option to ensure that the conventional locking structure is restored to the initial position immediately after being unfastened. The disadvantages of the aforesaid intricate fastening structure are as follows: adding to the manufacturing costs, and rendering an assembly process complicated. In view of this, the present disclosure provides, in an embodiment thereof, a locking structure for fastening together a first case and a second case.

The locking structure for fastening together a first case and a second case comprises a fastening portion, a hook portion and a tension spring. The fastening portion is disposed on the first case. The tension spring has one end disposed at the second case and the other end disposed at the hook portion. The hook portion is movable between a locking position and a release position. When the hook portion moves to the locking position under an applied force, the hook portion becomes fastened to the fastening portion. After the hook portion has separated from the fastening portion under an applied force, the tension spring exerts a restoring force under which the hook portion returns to the release position.

Therefore, the tension spring assists in moving and fastening the hook portion. After the hook portion has moved to the locking position, the tension spring exerts a stretching force under which the hook portion can firmly fasten the first case and the second case together. After the hook portion has separated from the fastening portion under an applied force, the tension spring pulls the hook portion back to the release position without a user's manipulation. Given the tension spring, the locking structure of the present disclosure is structurally simple, easy to assemble, conducive to a great reduction in the manufacturing components and costs, conducive to simplification of a manufacturing and assembly process, and conducive to a reduction in the time taken to perform the manufacturing and assembly process.

In an embodiment, the fastening portion comprises a first locking recess and a second locking recess such that the first locking recess and the second locking recess are disposed on opposing sides on an edge of the first case, respectively. Therefore, the hook portion can be fastened to the fastening portion, regardless of whether the first case is mounted in a manner to face forward or backward.

In an embodiment, the hook portion comprises a body and an operating portion, with the operating portion disposed on a lateral side of the body, the lateral side being disposed distal to the second case. The operating portion enables the user to operate the hook portion easily and allows the user to acquire a feel thereof while operating it.

In an embodiment, the hook portion comprises a body, a hook and two slide axles, the hook being disposed at an end of the body, and the two slide axles being disposed on two sides of the body and slidingly disposed on the second case. With the slide axles being disposed on two sides of the body and slidingly disposed on the second case, the hook portion is restricted to movement in a specific direction and thus confined to the locking position or the release position in the course of its movement. Since the hook portion is prevented from excessive displacement, the tension spring cannot stretch overly to cause damage.

In an embodiment, the second case comprises a receiving concave portion and two limit guide slots, the two limit guide slots being disposed on two opposing sides of the receiving concave portion, respectively, and the receiving concave portion receiving the hook portion, such that the slide axles are slidingly disposed in the limit guide slots, respectively. The limit guide slots and the receiving concave portion disposed on the second case together define a range of movement of the hook portion in a specific direction to thereby prevent the hook portion from moving to any position other than the locking position under a force exerted by the user and ensure that the hook portion will return to the initial release position when released under the force.

In an embodiment, the hook portion further comprises two limit elements disposed on lateral sides of the slide axles, respectively, and the lateral sides of the slide axles face the bottom side of the second case, to limit the displacement of the bottom of the hook portion moving to the release position.

In an embodiment, the hook portion comprises a body, a hook and a rib. The hook is disposed at one end of the body. The rib is disposed on the body. One side of the rib has an oblique surface facing the second case. Owing to the oblique surface, after moving upward to the locking position, the hook portion protrudes outward and thus engages with the fastening portion.

In an embodiment, the second case comprises a protruding portion. The protruding portion corresponds in position to the rib such that the rib abuts against the protruding portion while sliding. Therefore, the protruding portion not only enables the rib to abut against the protruding portion while sliding but also reduces the weight of the second case to thereby dispense with an integrally-formed plane associated with the protruding portion for the rib to abut against while sliding.

The features and advantages of the present disclosure are described in detail in the preferred embodiments of the present disclosure so as to enable persons skilled in the art to gain insight into the technical disclosure in the present disclosure and implement the present disclosure accordingly and readily understand the objectives, features, and advantages of the present disclosure by making reference to the disclosure contained in the specification, the claims, and the drawings of the present disclosure.

DETAILED DESCRIPTION OF THE EMBODIMENTS

Figure 1:
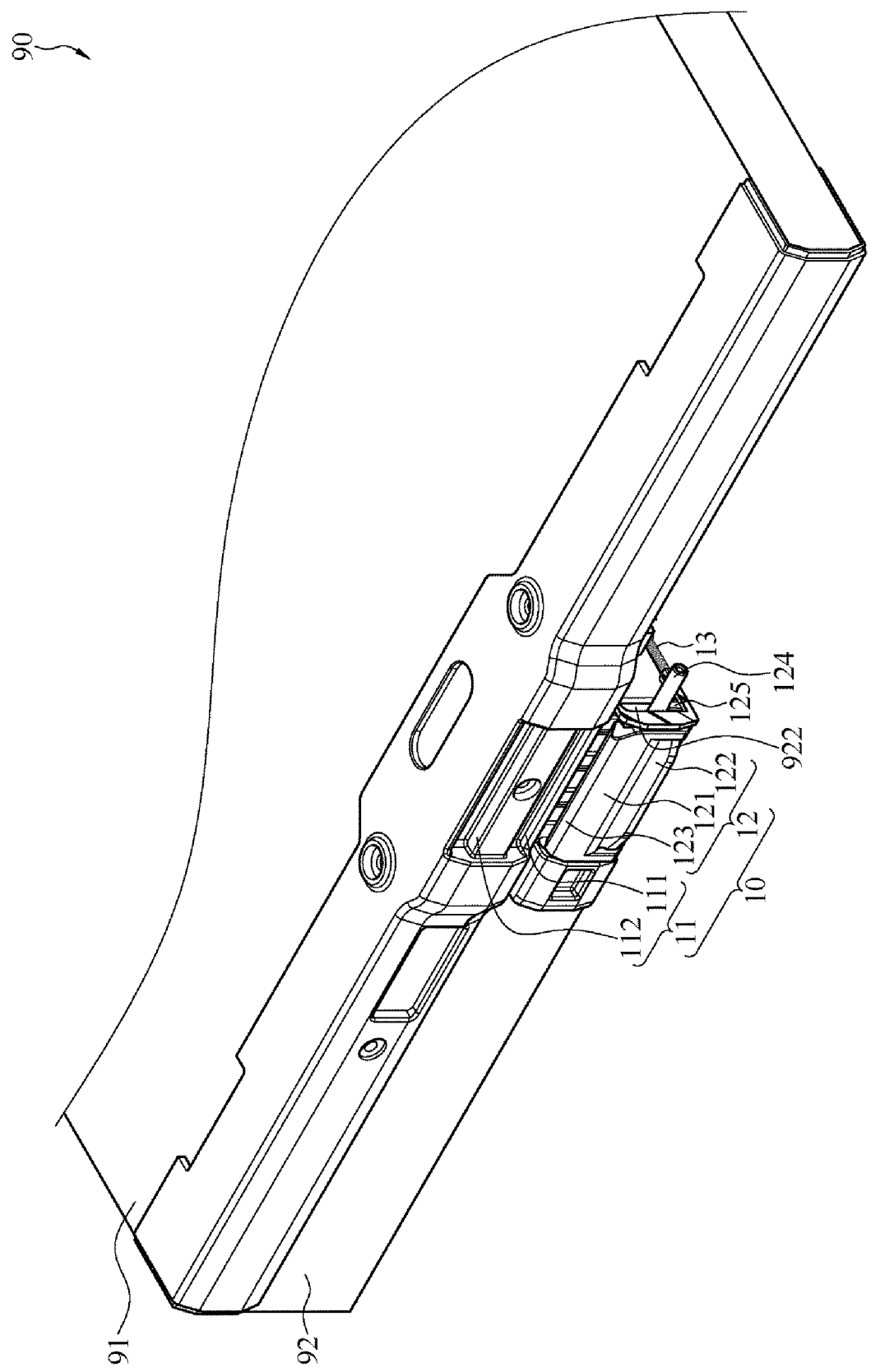
FIG. 1 is a schematic view of a locking structure at a release position according to the first embodiment of the present disclosure.
Figure 2:
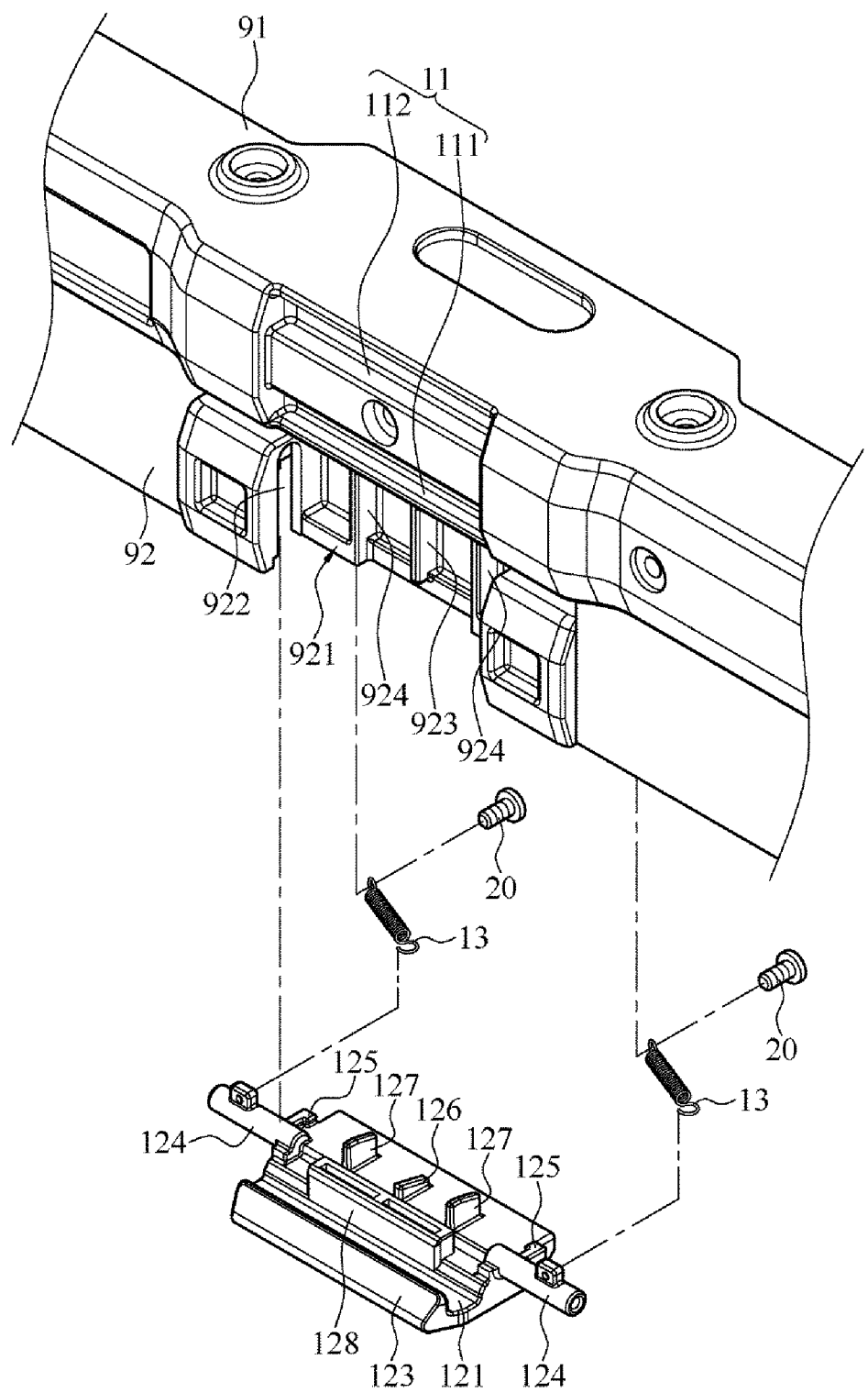
FIG. 2 is an exploded view of the locking structure according to the first embodiment of the present disclosure.
Figure 3:
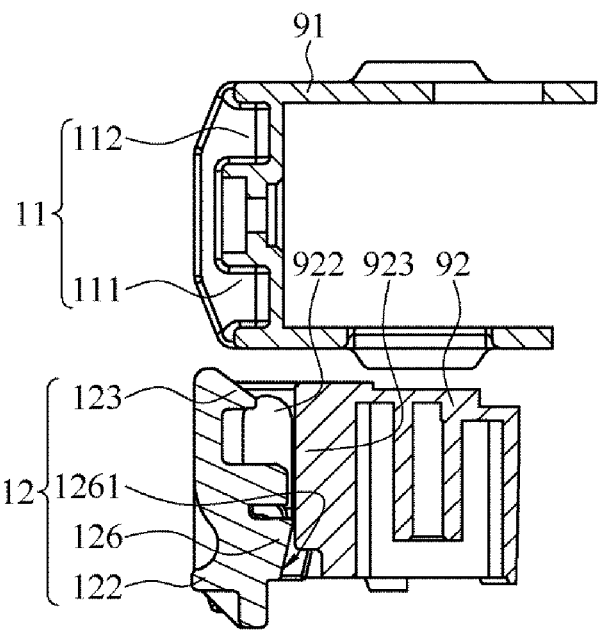
FIG. 3 is a cross-sectional view of the locking structure at the release position according to the first embodiment of the present disclosure.
Figure 4:
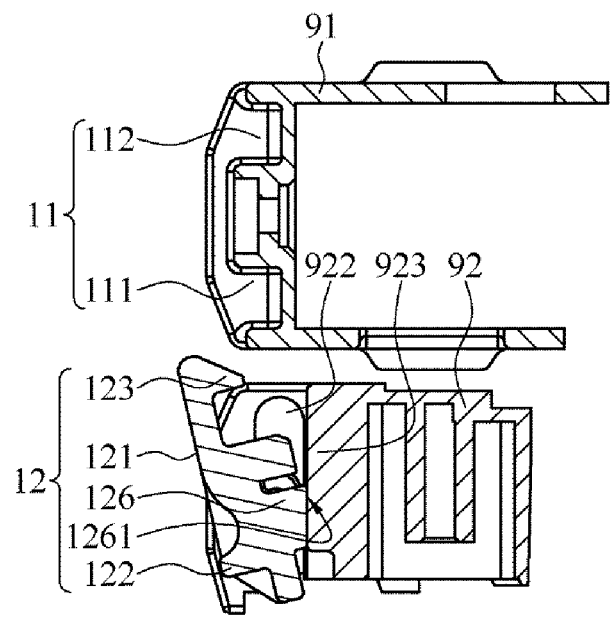
FIG. 4 is a cross-sectional view of the locking structure subjected to a force according to the first embodiment of the present disclosure.
Figure 5:
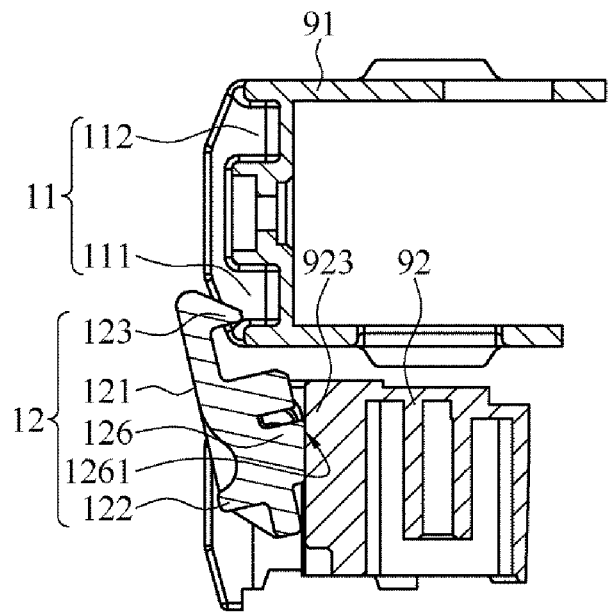
FIG. 5 is a cross-sectional view of the locking structure pushed upward under the force according to the first embodiment of the present disclosure.
Figure 6:
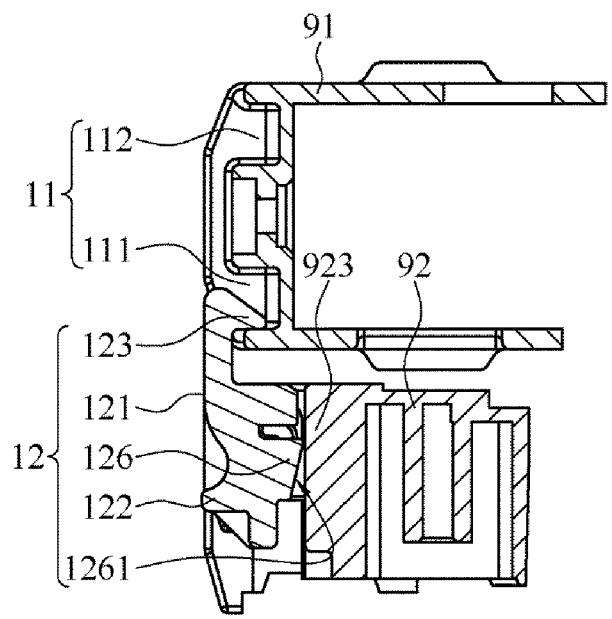
FIG. 6 is a cross-sectional view of the locking structure at a locking position according to the first embodiment of the present disclosure.
Figure 7:
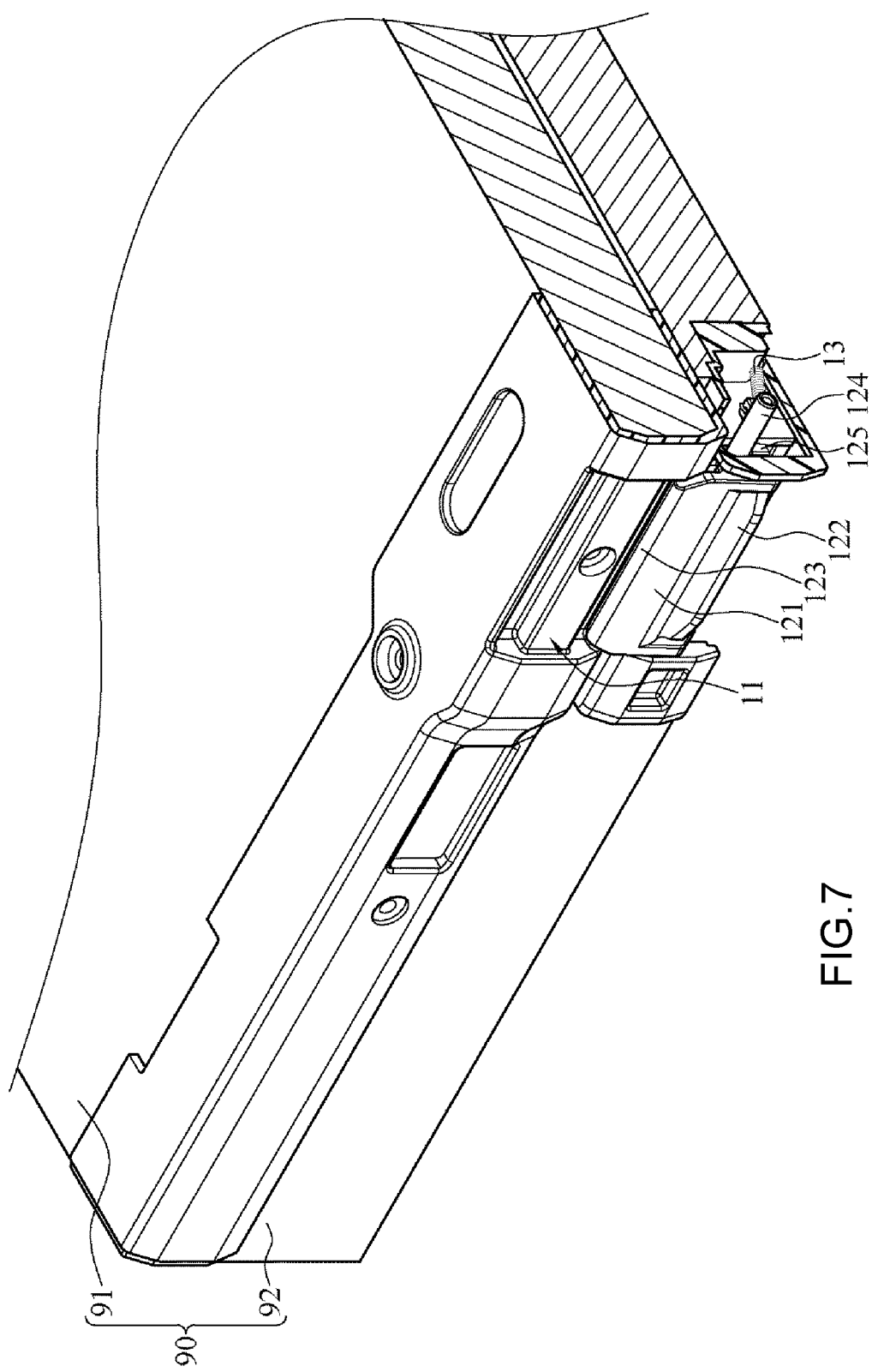
FIG. 7 is a cutaway view of the locking structure at the locking position according to the first embodiment of the present disclosure.

Referring to FIG. 1 and FIG. 6, the present disclosure provides a locking structure. FIG. 1 is a schematic view of a locking structure at a release position according to the first embodiment of the present disclosure. FIG. 2 is an exploded view of the locking structure according to the first embodiment of the present disclosure. FIG. 3 is a cross-sectional view of the locking structure at the release position according to the first embodiment of the present disclosure. FIG. 4 is a cross-sectional view of the locking structure subjected to a force according to the first embodiment of the present disclosure. FIG. 5 is a cross-sectional view of the locking structure pushed upward under the force according to the first embodiment of the present disclosure. FIG. 6 is a cross-sectional view of the locking structure at a locking position according to the first embodiment of the present disclosure. FIG. 7 is a cutaway view of the locking structure at the locking position according to the first embodiment of the present disclosure.

Referring to FIG. 1, in this embodiment, a locking structure 10 is for fastening together a first case 91 and a second case 92 of an electronic device 90. The electronic device 90 is exemplified by a laptop, but the present disclosure is not limited thereto. For the sake of illustration, just portions of the first case 91 and the second case 92 are shown in the diagram.

The locking structure 10 comprises a fastening portion 11, a hook portion 12 and two tension springs 13. As shown in FIG. 1, the fastening portion 11 is disposed on the first case 91, whereas the hook portion 12 is disposed on the second case 92. Although this embodiment is exemplified by the fastening portion 11 disposed on the first case 91 and the hook portion 12 disposed on the second case 92, the present disclosure is not limited thereto. Hence, the present disclosure will work, provided that the fastening portion 11 and the hook portion 12 are opposite each other by being disposed on two cases to be fastened together, respectively.

Referring to FIG. 1, in this embodiment, the fastening portion 11 is disposed at the middle of a long edge of the first case 91 and comprises a first locking recess 111 and a second locking recess 112. The first locking recess 111 and second locking recess 112 are disposed on two opposing sides on an edge of the first case 91, respectively. As shown in the cross-sectional view of FIG. 3, the first locking recess 111 is concavely disposed on a side of the first case 91, wherein the one side of the first case 91 is disposed proximate to the second case 92, whereas the second locking recess 112 is concavely disposed on a side of the first case 91, wherein the one side of the first case 91 is disposed distal to the second case 92. Given the locking recesses disposed on the two sides, the hook portion 12 can be fastened to the first locking recess 111 or the second locking recess 112 of the fastening portion 11, regardless of whether the first case 91 is mounted in a manner to face forward or backward.

This embodiment is exemplified by the fastening portion 11 having two locking recesses. However, in a variant embodiment, the first case 91 cannot turn over and be available, and only one locking recess is disposed proximate to the second case 92 so as to be fastened to the hook portion 12.

Referring to FIG. 1 and FIG. 2, this embodiment is exemplified by two tension springs 13 disposed on the left and right sides of the hook portion 12, respectively. However, in a variant embodiment, only one tension spring 13 is provided to exert an acting force required by the hook portion 12. In this embodiment, the tension springs 13 each have one end disposed at the second case 92 and the other end disposed at the hook portion 12. As shown in FIG. 2, the tension springs 13 each have one end hooked and fixed to the hook portion 12 and the other end fixed to the second case 92 by a fastening screw 20.

The hook portion 12 is movable between a locking position (shown in FIG. 6 and FIG. 7) and a release position (shown in FIG. 1 and FIG. 3). When the hook portion 12 is at the release position shown in FIG. 3, a user exerts a force on the hook portion 12 so as to fasten the locking structure 10 in place. After being subjected to an acting force exerted toward the second case 92 as shown in FIG. 4, the hook portion 12 rotates outward. Afterward, after being subjected to an upward acting force, the hook portion 12 moves upward to a point corresponding in position to the outside of the first locking recess 111 of the fastening portion 11 as shown in FIG. 5. After moving to this position, the tension springs 13 in the interior exert an inward acting force on the hook portion 12 continuously, so as to generate an acting force for clockwise rotations and thus cause a hook 123 of the hook portion 12 to be fastened to the first locking recess 111. At this moment, the hook portion 12 is fastened to the fastening portion 11, and thus the hook portion 12 is at the locking position as shown in FIG. 6. When the hook portion 12 is fastened to the fastening portion 11, as shown in FIG. 7, the tension springs 13 in the second case 92 are stretched and thus exert an acting force on the hook portion 12 continuously; hence, the hook portion 12 exerts a force on the first locking recess 111 of the first case 91 continuously and thus is fastened thereto, thereby fastening together the first case 91 and the second case 92 firmly.

Afterward, the locking state is disabled as follows: after the hook portion 12 has separated from the first locking recess 111 of the fastening portion 11 under a force, the tension spring 13 provides a restoring force under which the hook portion 12 returns to the release position (as shown in FIG. 1 and FIG. 3). The user only needs to exert a force on the top end of the hook portion 12 so that it separates from the first locking recess 111; hence, the hook portion 12 returns to the initial release position under the restoring force of the tension springs 13. The user can position the hook portion 12 in place without performing much operation. Given the tension springs 13, the locking structure of the present disclosure is structurally simple, easy to assemble, conducive to a great reduction in the manufacturing components and costs, conducive to simplification of a manufacturing and assembly process, and conducive to a reduction in the time taken to perform the manufacturing and assembly process.

Fine structural features of the hook portion 12 are described below. Referring to FIG. 1 through FIG. 3, the hook portion 12 comprises a body 121, an operating portion 122, a hook 123, two slide axles 124, two limit elements 125, a rib 126, two positioning ribs 127 and a stop element 128. As shown in FIG. 1 and FIG. 3, the operating portion 122 is disposed on a lateral side of the body 121, and the lateral side of the body 121 is positioned distal to the second case 92, whereas the operating portion 122 is also disposed on a lateral side of the body 121, and the lateral side of the body 121 is positioned distal to the first case 91. As shown in FIG. 3, the operating portion 122 is disposed on the bottom side and the left side of the body 121. To move the hook portion 12, the user exerts a force on the operating portion 122, so as to acquire a feel thereof while operating it.

As shown in FIG. 3, the hook 123 is disposed at an end of the body 121. In order to be fastened to the first locking recess 111 of the fastening portion 11 on the first case 91, the hook 123 is disposed at an end of the body 121, and the end of the body 121 is positioned proximate to the first case 91. Referring to FIG. 2, the two slide axles 124 are disposed on two sides of the body 121, respectively, and slidingly disposed within the second case 92. In this embodiment, the second case 92 comprises a receiving concave portion 921 and two limit guide slots 922. The two limit guide slots 922 are disposed on two opposing sides of the receiving concave portion 921, respectively. As shown in FIG. 1, when the hook portion 12 is disposed at the second case 92, the hook portion 12 is received in the receiving concave portion 921, whereas the two slide axles 124 are slidingly disposed in the two limit guide slots 922, respectively.

Therefore, when the hook portion 12 is subjected to an applied force, the hook portion 12, whose movement is limited by the two slide axles 124 and two limit guide slots 922, moves only vertically along the limit guide slots 922. Furthermore, the hook portion 12, whose movement is limited by the receiving concave portion 921 from the left and right, cannot move leftward and rightward under any force. Therefore, the hook portion 12 is restricted to movement in a specific direction and thus confined to the locking position or the release position in the course of its movement. Since the hook portion 12 is prevented from excessive displacement, the tension spring 13 cannot stretch overly to cause damage.

Referring to FIG. 2 through FIG. 4, the present disclosure is further described below. As shown in FIG. 2, a rib 126 and the two positioning ribs 127 are disposed on the body 121, whereas the rib 126 has an oblique surface 1261 facing one side of the second case 92. This embodiment is exemplified by one rib 126; however, in a variant embodiment, a plurality of ribs is disposed on the body 121 to assist with sliding and displacement. In this embodiment, as shown in FIG. 2, the positioning ribs 127 on the left and right sides of the rib 126, respectively, protrude more than the rib 126 and limit leftward and rightward displacement (to be described later). Furthermore, the rib 126 limits displacement. However, the present disclosure is not limited to the aforesaid arrangement.

As shown in FIG. 2, the second case 92 comprises three protruding portions 923, 924, namely the central protruding portion 923 corresponding in position to the rib 126 such that the rib 126 abuts against the central protruding portion 923 while sliding, and the left and right protruding portions 924 disposed outside the two positioning ribs 127. Therefore, when the hook portion 12 is disposed in the receiving concave portion 921, the two positioning ribs 127 are disposed between the two protruding portions 924. The left positioning rib 127 is near or even slightly abuts against the right lateral side of the left protruding portion 924, whereas the right positioning rib 127 is near or even slightly abuts against the left lateral side of the right protruding portion 924. Therefore, when the hook portion 12 moves to the locking position or returns to the release position, leftward and rightward displacement of the hook portion 12 in the receiving concave portion 921 is limited between the positioning ribs 127 and the protruding portions 924. Therefore, the hook portion 12 is confined to the locking position or the release position in the course of its movement. Since the hook portion 12 is prevented from excessive displacement, the tension spring 13 cannot stretch overly to cause damage.

In this embodiment, the protruding portions 923, 924 correspond in position to the rib 126 and the two positioning ribs 127. However, in a variant embodiment, an integrally-formed protruding plane is provided such that the rib 126 abuts against and lies on the protruding plane, whereas stop portions protruding to a greater extent are disposed on the left and right of the protruding plane. The protruding portions 923, 924 are provided such that areas outside the protruding portions 923, 924 are concavely hollowed out to therefore thin out the second case 92 here, so as to reduce materials and weight.

As shown in FIG. 2, the stop element 128 is disposed on the body 121 and below the hook 123. Relative to the slide axles 124, the stop element 128 protrudes slightly in the direction away from the body 121. After the hook portion 12 has been mounted on the receiving concave portion 921, the slide axles 124 are slidingly disposed in the left and right limit guide slots 922. At this moment, the stop element 128 presses against or abuts against the two protruding portions 924 which protrude more. When the hook portion 12 is to leave the locking position and return to the release position and after the fastening of the hook 123 of the hook portion 12 has been released, the hook 123 of the hook portion 12 moves to and engages with the receiving concave portion 921 under an acting force of the tension spring 13 and hits the components in the receiving concave portion 921 under the acting force. At this moment, the stop element 128 hits the protruding portions 924 directly to protect slender components, such as the rib 126 and the positioning ribs 127, against a violent hit which might otherwise lead to deformation.

As mentioned before, relative to the slide axles 124, the stop element 128 protrudes slightly in the direction away from the body 121, and thus the slide axles 124 will not directly abut against or hit the sidewalls of the limit guide slots 922 as soon as the stop element 128 abuts against the protruding portions 924, so as to preclude the slide axles 124 from wear and tear which might otherwise happen as a result of the reciprocating motion of the limit guide slots 922.

Referring to FIG. 1, FIG. 2 and FIG. 7, the two limit elements 125 of the hook portion 12 are respectively disposed on lateral sides of the slide axles 124 (the lateral sides of the slide axles 124 face the bottom side of the second case 92) to limit the displacement of the bottom of the hook portion 12 moving to the release position. As shown in FIG. 1, when the hook portion 12 is at the release position, the hook portion 12 is received in the receiving concave portion 921; meanwhile, the limit elements 125 are stopped on the bottom side of the second case 92 such that the hook portion 12 is positioned and received in the receiving concave portion 921 but no longer moves downward. In order for the hook portion 12 to be released from the locking position as shown in FIG. 6, when the hook portion 12 has been released under an applied force and is returning to the release position under the restoring force of the tension spring 13, the limit elements 125 abut against the bottom of the second case 92 as soon as the hook portion 12 bounces to the bottom of the second case 92, and thus the hook portion 12 is positioned and confined to the receiving concave portion 921 but no longer moves downward.

Although the present disclosure is disclosed above by embodiments, the embodiments are not restrictive of the present disclosure. Changes and modifications made by persons skilled in the art to the embodiments without departing from the spirit and scope of the present disclosure must be deemed falling within the scope of the present disclosure. Accordingly, the legal protection for the present disclosure should be defined by the appended claims.

What is claimed is:

1. A locking assembly, comprising:
 a first case having a first top side, a first bottom side, and a first lateral side;
 a second case having a second top side, a bottom side, and a second lateral side; and
 a locking structure, for fastening together the first case and the second case, the locking structure comprising:
  a fastening portion disposed on the first case, the fastening portion comprising a first locking recess and a second locking recess, the first locking recess located on the first lateral side proximate to the bottom side, the second locking recess located on the first lateral side proximate to the top side;
  a hook portion disposed on the lateral side of the second case; and
  a tension spring with an end disposed at the second case and another end disposed at the hook portion,
 wherein the locking assembly is arranged such that the hook portion is movable between a locking position and a release position, the hook portion being fastened to only the first locking recess fastening portion after moving to the locking position under an applied force when the first case and the second case mounted together with the first bottom side facing the second top side, the hook portion being fastened to only the second locking recess after moving to the locking position under an applied force when the first case and the second case mounted together with the first top side facing the second top side, and the hook portion being returned to the release position in which the book portion is disengaged from the first locking recess and the second locking recess under a restoring force exerted by the tension spring after escaping from the fastening portion under an applied force.

2. The locking assembly of claim 1, wherein the hook portion comprises a body and an operating portion, with the operating portion disposed on a lateral side of the body, the lateral side being disposed distal to the second case.

3. The locking assembly of claim 1, wherein the hook portion comprises a body, a hook and two slide axles, the hook being disposed at an end of the body, and the two slide axles being disposed on two sides of the body and slidingly disposed on the second case.

4. The locking assembly of claim 3, wherein the second case comprises a receiving concave portion and two limit guide slots disposed on the second lateral side, the two limit guide slots being disposed on two opposing sides of the receiving concave portion, respectively, and the receiving concave portion receiving the hook portion, such that the slide axles are slidingly disposed in the limit guide slots, respectively.

5. The locking assembly of claim 3, wherein the hook portion further comprises two limit elements disposed on lateral sides of the slide axles, respectively, and the lateral sides of the slide axles face the bottom side of the second case.

6. The locking assembly of claim 1, wherein the hook portion comprises a body, a hook and a rib, with the hook disposed at an end of the body, with the rib disposed on the body, and a side of the rib has an oblique surface facing the second case.

7. The locking assembly of claim 6, wherein the second case comprises a protruding portion corresponding in position to the rib such that the rib abuts against the protruding portion while sliding.

* * * * *